United States Patent
Liu et al.

(10) Patent No.: US 10,536,927 B2
(45) Date of Patent: Jan. 14, 2020

(54) METHODS AND APPARATUSES FOR PROCESSING SCHEDULING OF APERIODIC INFORMATION TRANSMISSION

(75) Inventors: Jin Liu, PuDong Jinqiao Shanghai (CN); Xudong Zhu, PuDong Jinqiao Shanghai (CN)

(73) Assignee: Alcatel Lucent, Nozay (FR)

( * ) Notice: Subject to any disclaimer, the term of this patent is extended or adjusted under 35 U.S.C. 154(b) by 121 days.

(21) Appl. No.: 13/817,221

(22) PCT Filed: Mar. 18, 2011

(86) PCT No.: PCT/IB2011/000775
§ 371 (c)(1),
(2), (4) Date: Feb. 15, 2013

(87) PCT Pub. No.: WO2012/023007
PCT Pub. Date: Feb. 23, 2012

(65) Prior Publication Data
US 2013/0142163 A1   Jun. 6, 2013

(30) Foreign Application Priority Data
Aug. 17, 2010   (CN) .......................... 2010 1 0260883

(51) Int. Cl.
*H04W 72/04*        (2009.01)
(52) U.S. Cl.
CPC .................................. *H04W 72/04* (2013.01)
(58) Field of Classification Search
CPC ....... H04L 1/0026–0028; H04L 5/0053–0057; H04W 72/04

(Continued)

(56) References Cited

U.S. PATENT DOCUMENTS

2009/0135927 A1   5/2009  Prakash
2011/0249582 A1*  10/2011 Choi et al. .................... 370/252
(Continued)

FOREIGN PATENT DOCUMENTS

| CN | 101651996 | 2/2010 |
| JP | 2013503666 | 2/2013 |
| WO | WO 2009/096698 A2 | 8/2009 |
| WO | WO 2011/032397 | 3/2011 |

OTHER PUBLICATIONS

Texas Instruments, "UCI Transmission on PUSCH for Carrier Aggregation," $3^{rd}$ Generation Partnership Project (3GPP), XP050449131, 3GPP TSG RAN WG1 #61bis, R1-103694, pp. 1-6, Dresden, Germany, Jun. 28-Jul. 2, 2010.

(Continued)

*Primary Examiner* — Albert T Chou
(74) *Attorney, Agent, or Firm* — Fay Sharpe LLP

(57) ABSTRACT

Embodiments of the present invention disclose triggering methods and apparatuses of aperiodic channel state information CSI and an aperiodic sounding reference signal SRS for a carrier aggregation system. The method comprises: (1) pre-assigning a corresponding relationship between bits of the CSI request field in an uplink grant and multiple downlink component carriers DL CCs of user equipment, wherein the number of bits of the CSI request field is greater than 1 and less than the maximum allowed number of DL CCs in the system; (2) determining the DL CC for which aperiodic CSI reporting is to be triggered; and (3) mapping the CSI request field in the uplink grant according to the pre-assigned corresponding relationship to mark the value of the bit corresponding to the determined DL CC as "trigger".

16 Claims, 12 Drawing Sheets

(58) Field of Classification Search
USPC .................................................. 370/329, 252
See application file for complete search history.

(56) References Cited

U.S. PATENT DOCUMENTS

| | | | | |
|---|---|---|---|---|
| 2011/0274064 | A1* | 11/2011 | Luo et al. ..................... | 370/329 |
| 2011/0305161 | A1* | 12/2011 | Ekpenyong et al. ......... | 370/252 |
| 2012/0076017 | A1* | 3/2012 | Luo et al. ..................... | 370/252 |
| 2012/0266876 | A1 | 10/2012 | Nagel et al. | |
| 2013/0258986 | A1* | 10/2013 | Seo et al. ..................... | 370/329 |

OTHER PUBLICATIONS

LG Electronics, "Details on Dynamic aperiodic Sounding for LTE-Advanced," 3$^{rd}$ Generation Partnership Project (3GPP), XP050449459, 3GPP TSG RAN WG1 Meeting #61bis, R1-103979, pp. 1-4, Dresden, Germany, Jun. 28-Jul. 2, 2010.

Alcatel-Lucent Shanghai Bell et al., "Triggering of Aperiodic CSI with Carrier Aggregation," 3$^{rd}$ Generation Partnership Project (3GPP), XP050450092, 3GPP TSG RAN WG1 Meeting #62, R1-104390, pp. 1-5, Madrid, Spain, Aug. 23-27, 2010.

Alcatel-Lucent Shanghai Bell et al., "Triggering of Dynamic Aperiodic SRS with Carrier Aggregation," 3$^{rd}$ Generation Partnership Project (3GPP), XP050450095, 3GPP TSG RAD WG1 Meeting #62, R1-104404, pp. 1-5, Madrid, Spain, Aug. 23-27, 2010.

International Search Report for PCT/IB2011/000775 dated Aug. 29, 2011.

Motorola, "LTE—A Dynamic Aperiodic SRS—Triggering, Duration, Timing and Carrier Aggregation", 3GPP TSG RAN WG1 Meeting #61, R1-103187, Montreal Canada May 10-14, 2010, pp. 1-5.

Fujitsu, "UL ACK/NACK Feedback for LTE-A" ,3GPP TSG-RAN 1 #60, R1-101023, San Francisco, USA, Feb. 22-26, 2010, pp. 1-3.

* cited by examiner

METHODS AND APPARATUSES FOR PROCESSING SCHEDULING OF APERIODIC INFORMATION TRANSMISSION

TECHNICAL FIELD

The present invention relates to carrier aggregation systems, and more specifically, to triggering and reporting methods and apparatuses of aperiodic channel state-related information for a carrier aggregation system.

DESCRIPTION OF THE RELATED ART

LTE-Advanced has introduced carrier aggregation technology in order to support operation within higher bandwidths. Carrier aggregation can jointly serve User Equipment (UE) by aggregating several discrete frequency bands. In consideration of backward compatibility of LTE, LTE-Advanced has introduced the concept of component carrier (referred to as CC for short). In LTE, each cell has only one CC, and each UE also has only one CC that serves this UE. In LTE-Advanced, however, each cell has multiple CCs, and each UE may have multiple CCs that serve this UE. Due to the introduction of carrier aggregation technology into LTE-Advanced, scheduling (or triggering) of aperiodic information in LTE-Advanced becomes more complex, and can not reuse existing mechanisms in LTE.

Specifically, in LTE-Advanced, multiple CCs (up to 5 CCs are allowed at present) may be configured for each cell, and each UE also may use multiple CCs. However, not all UE will use all CCs in a cell where they are located. CCs that are used by UE are referred to as configured CCs, and unused ones are referred to as non-configured CCs. Different UE might have different configured/non-configured CCs. Configured CCs may further be divided into activated CCs and deactivated CCs. UE transmits data on activated CCs and performs no data transmission on deactivated CCs. For each UE, the number of configured or activated uplink component carriers (UL CCs) may be either equal to (this case is referred to as symmetric carrier aggregation) or different from (this case is referred to as asymmetric carrier aggregation) that of configured or activated downlink component carriers (DL CCs). Regarding scheduling, Node B (eNB) may schedule on one DL CC data or control information transmission on the paired UL CC, or data or control information transmission on other UL CC (i.e., unpaired UL CC) (this case is referred to as cross scheduling).

In view of the asymmetric carrier aggregation, cross-carrier scheduling and carrier activation/deactivation mechanisms used in the above-described LTE-Advanced systems, scheduling technology for aperiodic information transmission as used in LTE is no longer suitable for LTE-Advanced systems. The aperiodic information transmission comprises, for example, aperiodic Channel Quality Indicator (referred to as CQI for short) reporting or aperiodic uplink sounding reference signal (SRS) transmission.

Specifically, since there is only one CC in LTE, it is possible to indicate scheduling of aperiodic channel state information (referred to as CSI for short) reports simply through one bit in DCI format 0. For example, in LTE Rel-8, CSI reports are scheduled (or triggered) through a CQI request bit in DCI format 0. The CSI comprises, for example, Channel Quality Indicator (CQI), Precoding Matrix Indicator (PMI), Rank Indicator (RI), and other information. However, such a method is not suitable for LTE-Advanced systems that use carrier aggregation technology. Therefore, there is a need for a new mechanism for aperiodic CSI reporting and aperiodic SRS transmission which is suitable for LTE-Advanced.

In the last RAN1-#61bis meeting, the discussion on aperiodic CSI reporting was focused on the transmission of aperiodic CSI reports, i.e., selecting which UL CC to convey aperiodic CSI reports. There are only limited discussions on another issue of aperiodic CSI reporting, i.e., a mechanism for triggering aperiodic CSI reporting provided for multiple DL CCs.

Nowadays there are proposed some ways of triggering aperiodic CSI reporting for multiple DL CCs (i.e., carrier aggregation) by using uplink grants (UL grant). For example, various methods of using one UL grant to trigger aperiodic CSI reporting for one DL CC are proposed in R1-103684, which are briefed as below.

1. CQI triggering by SIB2-linkage. In this solution, the CSI report for one DL CC can only be triggered by a UL grant on the same CC. Furthermore, the UL grant is transmitted on the SIB2-linked UL CC.

For the case where the SIB2-linked UL CC is not configured for a UE, some modifications would be required. For example, it may be possible to map the carrier indicator field (referred to as CIF for short) to the CC that requires a CSI report (referred to as CSI-CC for short).

2. CSI scanning. A UL grant triggers consecutive CSI reports that scan through all DL CCs, on a periodic basis.

3. Explicit mapping. An m-bit CSI fields is added to the UL DCI format (the uplink grant is carried in the UL DCI format) to indicate the CSI-CC that is conveyed on the PUSCH, where m can be 3 bits. Note that this is similar to the CIF field for cross-CC scheduling, but in this case the m-bit CSI field is used for CSI-CC indication.

4. The CSI-CC field is jointly encoded with a 1-bit CQI trigger. In this case, $m=\log_2(N_{cc}+1)$ bits are needed to jointly indicate the CSI triggering and the CSI-CC index, where $N_{cc}$ denotes the number of activated DL CCs.

For detailed information of the above solutions, please refer to R1-103694, "UCI transmission on PUSCH for carrier aggregation," TI, which is incorporated into here by reference.

However, the above methods only can trigger the aperiodic CSI reporting for one DL CC by using one uplink grant. As mentioned in R1-103694, triggering one aperiodic CSI reporting for one DL CC limits the CSI feedback payload. Furthermore, since multiple uplink grants are needed to be sent while triggering aperiodic CSI reporting for multiple DL CCs, this increases overhead for uplink grants and also increases feedback delay for CSI reporting of all activated DL CCs.

On the other hand, there is currently proposed a solution for triggering aperiodic CSI reporting for all DL CCs by using one uplink grant. In this solution, not only CSI reporting for involved DL CCs is triggered, but also CSI reporting for other undesired DL CCs is triggered. Therefore, this incurs large CSI reporting overhead and undifferentiated reporting manners.

Triggering of aperiodic SRS transmission contains similar problems to triggering of aperiodic CSI reporting.

SUMMARY OF THE INVENTION

In view of the existing problems in the prior art, embodiments of the present invention provide improved processing methods and apparatuses of aperiodic information transmission for a carrier aggregation system.

According to an embodiment of the present invention, there is provided a triggering method of aperiodic channel state information CSI for a carrier aggregation system, comprising:

(1) pre-assigning a corresponding relationship between bits of the CSI request field in an uplink grant and multiple downlink component carriers DL CCs of user equipment, wherein the number of bits of the CSI request field is greater than 1 and less than the maximum allowed number of DL CCs in the system;

(2) determining the DL CC for which aperiodic CSI reporting is to be triggered; and (3) mapping the CSI request field in the uplink grant according to the pre-assigned corresponding relationship to mark the value of the bit corresponding to the determined DL CC as "trigger."

According to another embodiment of the present invention, there is provided a reporting method of aperiodic channel state information CSI for a carrier aggregation system, comprising:

(1) pre-assigning a corresponding relationship between bits of the CSI request field in an uplink grant and multiple downlink component carriers DL CCs of user equipment, wherein the number of bits of the CSI request field is greater than 1 and less than the maximum allowed number of DL CCs in the system; and (2) demapping, according to the pre-assigned corresponding relationship, the CSI request field in the received uplink grant so as to determine the DL CC for which aperiodic CSI reporting will be implemented.

In a preferred embodiment, step (1) further comprises dividing all DL CCs of the user equipment UE into multiple subsets and corresponding different bits of the CSI request field to different subsets. And step (3) further comprises marking the value of a bit corresponding to a subset to which the DL CC as determined in step (2) belongs as "trigger."

Preferably, the number of bits of the CSI request field is equal to the number of subsets into which DL CCs are divided, and each bit corresponds to a different subset.

In another preferred embodiment, step (1) further comprises corresponding one bit of the CSI request field in the uplink grant to the DL CC that is carrying the uplink grant, and corresponding the remaining bits to different DL CCs according to a priority order of DL CCs or CC serial numbers given by upper layer signaling. And step (3) further comprises marking the value of a bit corresponding to the DL CC determined in step (2) as "trigger" during mapping of the CSI request field.

Preferably, DL CCs corresponding to the remaining bits do not include a DL CC that has a paired uplink component carrier UL CC on which there is data transmission on an uplink shared channel UL SCH.

Preferably, the method further comprise sending multiple single-bit triggering uplink grants in the same subframe as the first uplink grant or in a subsequent subframe when one uplink grant is not sufficient to trigger CSI reporting for all DL CCs determined in step (2).

According to another embodiment of the present invention, there is provided a triggering apparatus of aperiodic channel state information CSI for a carrier aggregation system, comprising:

first pre-assigning means, for pre-assigning a corresponding relationship between bits of the CSI request field in an uplink grant and multiple downlink component carriers DL CCs of user equipment, wherein the number of bits of the CSI request field is greater than 1 and less than the maximum allowed number of DL CCs in the system;

first determining means, for determining the DL CC for which aperiodic CSI reporting is to be triggered; and mapping means, for mapping the CSI request field in the uplink grant according to the pre-assigned corresponding relationship to mark the value of a bit corresponding to the determined DL CC as "trigger."

According to another embodiment, there is provided a reporting apparatus of aperiodic channel state information CSI for a carrier aggregation system, comprising:

second pre-assigning means, for pre-assigning a corresponding relationship between bits of the CSI request field in an uplink grant and multiple downlink component carriers DL CCs of user equipment, wherein the number of bits of the CSI request field is greater than 1 and less than the maximum allowed number of DL CCs in the system; and second determining means, for demapping, according to the pre-assigned corresponding relationship, the CSI request field in the received uplink grant so as to determine the DL CC for which aperiodic CSI reporting will be implemented.

According to another embodiment of the present invention, there is provided a triggering method of an aperiodic uplink sounding reference signal SRS for a carrier aggregation system, comprising:

(1) pre-assigning a corresponding relationship between bits of the SRS request field in an uplink grant and multiple uplink component carriers UL CCs of user equipment, wherein the number of bits of the SRS request field is greater than 1 and less than the maximum allowed number of UL CCs in the system;

(2) determining the UL CC for which aperiodic SRS is to be triggered; and (3) mapping the SRS request field in the uplink grant according to the pre-assigned corresponding relationship to mark the value of a bit corresponding to the determined UL CC as "trigger."

In another preferred embodiment, step (1) further comprises dividing all UL CCs of the user equipment UE into multiple subsets and corresponding different bits of the SRS request field to different subsets. And step (2) further comprises determining that SRS transmission is to be implemented on all UL CCs in the subset corresponding to the bit that is marked as "trigger" in the SRS request field.

Preferably, step (1) further comprises corresponding one bit of the SRS request field in the uplink grant to the CC that is specified by the carrier indicator field in the same uplink grant, and corresponding the remaining bits to different UL CCs according to a priority order of UL CCs or CC serial numbers given by upper layer signaling. And step (2) further comprises determining that SRS transmission is to be implemented on the UL CC corresponding to the bit that is marked as "trigger" in the SRS request field.

According to another embodiment of the present invention, there is provided a transmission method of an aperiodic uplink sounding reference signal SRS for a carrier aggregation system, comprising:

(1) pre-assigning a corresponding relationship between bits of the SRS request field in an uplink grant and multiple uplink component carriers UL CCs of user equipment, wherein the number of bits of the SRS request field is greater than 1 and less than the maximum allowed number of UL CCs in the system; and (2) demapping, according to the pre-assigned corresponding relationship, the SRS request field in the received uplink grant so as to determine the UL CC for which SRS transmission will be implemented.

According to another embodiment of the present invention, there is provided a triggering apparatus of an aperiodic uplink sounding reference signal SRS for a carrier aggregation system, comprising:

third pre-assigning means, for pre-assigning a corresponding relationship between bits of the SRS request field in an uplink grant and multiple uplink component carriers UL CCs of user equipment, wherein the number of bits of the SRS request field is greater than 1 and less than the maximum allowed number of UL CCs in the system;

third determining means, for determining the UL CC for which aperiodic SRS is to be triggered; and third mapping means, for mapping the SRS request field in the uplink grant according to the pre-assigned corresponding relationship to mark the value of a bit corresponding to the determined UL CC as "trigger."

According to another embodiment of the present invention, there is provided a transmission apparatus of an aperiodic uplink sounding reference signal SRS for a carrier aggregation system, comprising:

fourth pre-assigning means, for pre-assigning a corresponding relationship between bits of the SRS request field in an uplink grant and multiple uplink component carriers UL CCs of user equipment, wherein the number of bits of the SRS request field is greater than 1 and less than the maximum allowed number of UL CCs in the system; and fourth determining means, for demapping, according to the pre-assigned corresponding relationship, the SRS request field in the received uplink grant so as to determine the UL CC for which SRS transmission will be implemented.

According to another embodiment of the present invention, there is provided a triggering method of aperiodic channel state information CSI for a carrier aggregation system, comprising:

(1) pre-assigning a mapping relationship between different values of the CSI request field in an uplink grant and CSI requests for different combinations of downlink component carriers DL CCs, wherein the number of bits of the CSI request field is greater than 1 and less than the maximum allowed number of DL CCs in the system;

(2) determining the DL CC for which aperiodic CSI reporting is to be triggered; and (3) populating values of the CSI request field in the uplink grant according to the pre-assigned mapping relationship and the determined DL CC.

In a preferred embodiment, the mapping relationship comprises mapping a first value of the CSI request field to indicate that CSI reporting for the DL CC carrying the uplink grant is to be triggered, and mapping a second value of the CSI request field to indicate that CSI reporting for all DL CCs is to be triggered.

According to another embodiment of the present invention, there is provided a reporting method of aperiodic channel state information CSI for a carrier aggregation system, comprising:

(1) pre-assigning a mapping relationship between different values of the CSI request field in an uplink grant and CSI requests for different combinations of downlink component carriers DL CCs, wherein the number of bits of the CSI request field is greater than 1 and less than the maximum allowed number of DL CCs in the system; and (2) demapping, according to the pre-assigned mapping relationship, the CSI request field in the received uplink grant so as to determine a DL CC for which aperiodic CSI reporting is to be implemented.

According to another embodiment of the present invention, there is provided a triggering apparatus of aperiodic channel state information CSI for a carrier aggregation system, comprising:

(1) fifth pre-assigning means, for pre-assigning a mapping relationship between different values of the CSI request field in an uplink grant and CSI requests for different combinations of downlink component carriers DL CCs, wherein the number of bits of the CSI request field is greater than 1 and less than the maximum allowed number of DL CCs in the system;

(2) fifth determining means, for determining the DL CC for which aperiodic CSI reporting is to be triggered; and (3) fifth mapping means, for populating values of the CSI request field in the uplink grant according to the pre-assigned mapping relationship and the determined DL CC.

According to another embodiment of the present invention, there is provided a reporting apparatus of aperiodic channel state information CSI for a carrier aggregation system, comprising:

(1) sixth pre-assigning means, for pre-assigning a mapping relationship between different values of the CSI request field in an uplink grant and CSI requests for different combinations of downlink component carriers DL CCs, wherein the number of bits of the CSI request field is greater than 1 and less than the maximum allowed number of DL CCs in the system; and (2) sixth determining means, for demapping, according to the pre-assigned mapping relationship, the CSI request field in the received uplink grant so as to determine a DL CC for which aperiodic CSI reporting is to be implemented.

According to another embodiment of the present invention, there is provided a triggering method of an aperiodic uplink sounding reference signal SRS for a carrier aggregation system, comprising:

(1) pre-assigning a mapping relationship between different bits of the SRS request field in an uplink grant and SRS requests for different combinations of uplink component carriers UL CCs, wherein the number of bits of the SRS request field is greater than 1 and less than the maximum allowed number of UL CCs in the system;

(2) determining the UL CC for which aperiodic SRS is to be triggered; and (3) populating values of the SRS request field in the uplink grant according to the pre-assigned mapping relationship and the determined UL CC.

In a preferred embodiment, the mapping relationship comprises: mapping a first value of the SRS request field to indicate that SRS transmission on the CC specified by the carrier indicator field in the uplink grant is to be triggered, and mapping a second value of the SRS request field to indicate that SRS transmission on all UL CCs is to be triggered.

According to another embodiment of the present invention, there is provided a transmission method of an aperiodic uplink sounding reference signal SRS for a carrier aggregation system, comprising:

(1) pre-assigning a mapping relationship between different bits of the SRS request field in an uplink grant and SRS requests for different combinations of uplink component carriers UL CCs, wherein the number of bits of the SRS request field is greater than 1 and less than the maximum allowed number of UL CCs in the system; and (2) demapping, according to the pre-assigned mapping relationship, the SRS request field in the received uplink grant so as to determine a UL CC on which SRS transmission is to be implemented.

According to another embodiment of the present invention, there is provided a triggering apparatus of an aperiodic uplink sounding reference signal SRS for a carrier aggregation system, comprising:

(1) seventh pre-assigning means, for pre-assigning a mapping relationship between different bits of the SRS request field in an uplink grant and SRS requests for different combinations of uplink component carriers UL CCs, wherein the number of bits of the SRS request field is greater than 1 and less than the maximum allowed number of UL CCs in the system;

(2) seventh determining means, for determining the UL CC for which aperiodic SRS is to be triggered; and (3) seventh mapping means, for populating values of the SRS request field in the uplink grant according to the pre-assigned mapping relationship and the determined UL CC.

According to another embodiment of the present invention, there is provided a transmission apparatus of an aperiodic uplink sounding reference signal SRS for a carrier aggregation system, comprising:

(1) eighth pre-assigning means, for pre-assigning a mapping relationship between different bits of the SRS request field in an uplink grant and SRS requests for different combinations of uplink component carriers UL CCs, wherein the number of bits of the SRS request field is greater than 1 and less than the maximum allowed number of UL CCs in the system; and (2) eighth determining means, for demapping, according to the pre-assigned mapping relationship, the SRS request field in the received uplink grant so as to determine a UL CC on which SRS transmission is to be implemented.

BRIEF DESCRIPTION OF THE DRAWINGS

Other features, objects, and advantages of the present invention will become more apparent from the detailed description of the non-limiting embodiments, when taken in conjunction with the figures wherein.

DETAILED DESCRIPTION OF THE PREFERRED EMBODIMENT

Methods and apparatuses for processing aperiodic channel state information transmission for a carrier aggregation system will be described below with reference to the specific embodiments and in conjunction with the figures. The aperiodic information transmission comprises, for example, aperiodic CSI reporting or aperiodic SRS transmission.

According to the embodiments of the present invention, there are provided methods and apparatuses for triggering aperiodic CSI reporting and aperiodic SRS transmission on PUSCH for carrier aggregation.

Aperiodic CSI Request

In the embodiments of the present invention, there is provided an efficient mechanism to trigger aperiodic CSI reporting for configurable multiple DL CCs (N, for example, N being a positive integer equal to or greater than 1) by limited bit-mapping bits, where N is equal to or less than the number $N_{cc}$ of configured or activated CCs for UE, so as to achieve a tradeoff between DCI format size and UL grant overhead. In systems where some embodiments are applied, only requesting or triggering of CSI reporting for activated DL CCs might be allowed; hence, only activated CCs of UE are considered in such embodiments. In systems where other embodiments are applied, only triggering of CSI reporting for deactivated DL CCs might be allowed; hence, configured CCs of UE should be considered in those embodiments.

Figure 1:
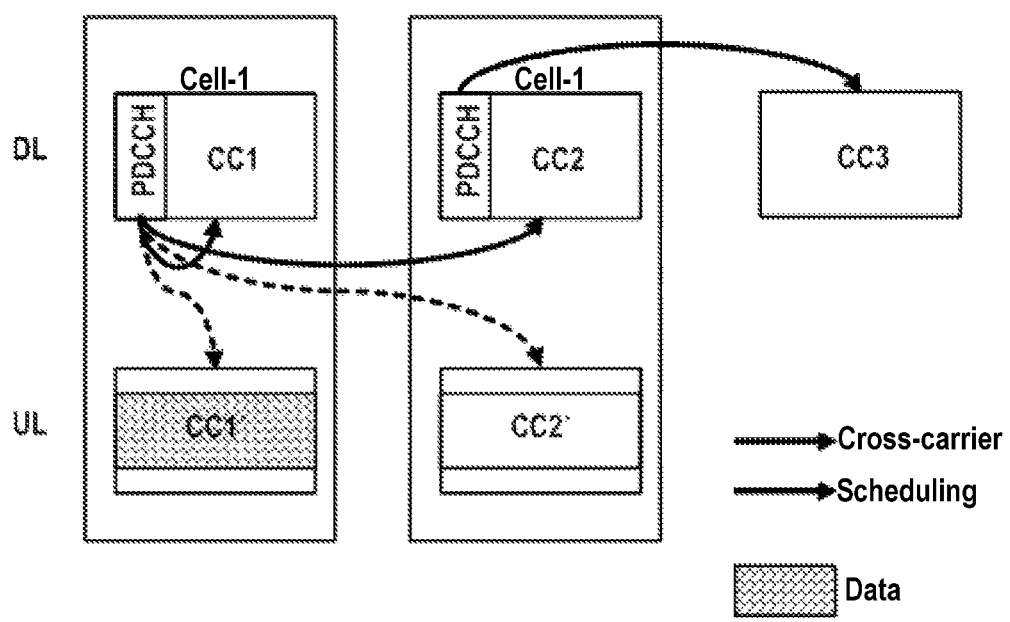
FIG. 1 illustrates a schematic view of DL/UL pair and cross-carrier scheduling in an LTE-Advanced system.

As known from RAN2, up to 5 CCs may be configured for each cell, and each UL CC is always paired with one DL CC to compose a cell, within which UL grants and DL assignments are always scheduled from the same cell, as illustrated in FIG. 1. Based on this agreement, several ways of triggering aperiodic CSI reporting for multiple configurable DL CCs are proposed in the embodiments of the present invention.

Alt1: Bit mapping with 5-bit in all UL grants to trigger aperiodic CSI reporting for up to 5 configurable DL CCs. If the number of activated DL CCs for the specific UE is less than 5, some bits in the 5-bit field of aperiodic CSI request are reserved. Although these reserved bits are unnecessary to be decoded correctly in this case, the 5-bit field of aperiodic CSI request is always configured for all UL grants, which increases the size of all DCI formats for UL grant.

Even though 5-bit aperiodic CSI requests are configured for all UL grants, another issue is raised whether to overlap the aperiodic CSI request field or not for multiple UL grants when multiple UL grants are sent in one subframe (or TTI) by eNB (including the eNB configuration and the UE corresponding behavior). To avoid confusion, it is proposed to specify two different ways as follows.

a) Specify that the UE should follow the aperiodic CSI request in one UL grant and ignore the aperiodic CSI request in other UE grants in line with the principle of uplink control information (UCI) multiplexing on PUSCH for carrier aggregation.

In the case that there is a PUSCH (uplink shared channel) transmission with data on the prime component carrier (PCC), the UE follows the aperiodic CSI request in the UL grant provided for PCC to trigger the aperiodic CSI reporting and ignores the aperiodic CSI request in other UE grants.

In the case that there is one or more PUSCH transmissions with data and no PUSCH transmission with data on PCC, the UE follows the aperiodic CSI request in the UL grant provided for SCC to trigger the aperiodic CSI reporting and ignores the aperiodic CSI request in other UE grants. If there are multiple SCCs, it is possible to pre-specify which SCC to be selected by higher layer signalling or specify a priority order for selection.

b) Specify that the aperiodic CSI request field in the uplink grant is 5-bits. The eNB configures the same content for the 5-bit aperiodic CSI request in all UL grants, and the UE follows the aperiodic CSI request that most CCs have the same indication. For example, for each CC, the aperiodic CSI reporting for the CC is triggered if $$\sum_{i=1}^{N_{cc}} b_i \geq \left\lceil \frac{N_{cc}}{2} \right\rceil,$$

otherwise not triggered, where $b_i$ is the triggering value of each CC ($b_i=0, 1$, 0 denotes not trigger, and 1 denotes trigger). Specifically, assuming 3 UL grants are sent in one subframe and for CC1, only one uplink grant indicates trigger and the other two do not indicate trigger, i.e., $b_1=0$, $b_2=0$, $b_3=1$, the aperiodic CSI reporting for DL CC1 is not triggered.

Alt2: The aperiodic CSI request field in the uplink grant is 1-bit. eNB keeps the 1-bit aperiodic CSI request in all UL grants and sends a UL grant for each DL CC which needs to trigger aperiodic CSI reporting. If multiple DL CCs need to trigger aperiodic CSI reporting, multiple uplink grants are then needed to be sent according to this method. Therefore, UL grant overhead is significantly increased, although every DCI format of the UL grants has the minimum size.

Alt3: The aperiodic CSI request field in the uplink grant has a limited number of bits, where the number of bits is greater than 1 and less than the allowed number of CCs in the system. Bit mapping with limited bits in all UL grants are used to trigger aperiodic CSI reporting for the requisite DL CCs such as, the DL CC with which no UL CC is paired (e.g., CC3 in FIG. 1), and the DL CC with which a UL CC is paired, wherein the paired UL CC has no UL-SCH data transmissions (e.g., CC2 in FIG. 1).

The DL CC whose paired UL CC has UL-SCH data transmission (e.g., CC1 in FIG. 1) does not belong to the above requisite DL CCs. Since the UL grant is required to schedule UL data transmission in this case, using the aperiodic CSI request in its UL grant does not increase UL grant overhead.

In reality, it seldom happens that all 5 DL CCs are configured or activated for the specific UE and simultaneously all the configured or activated DL CCs operate like CC2 (whose paired UL CC has no UL-SCH data transmission) or CC3 (which has no paired UL CC). Therefore, using bit mapping with 3 bits to trigger aperiodic CSI reporting may be sufficient in most scenarios. In case that 3 bits are not enough in the worst scenario, several solutions could be used to address as complementarities.

For example, in addition to sending an uplink grant with UL-SCH data transmission (referred to as a first uplink grant), remaining DL CCs that are not triggered by the first uplink grant are triggered by using one or more further DL CCs. For example, single-bit triggering uplink grants as many as remaining DL CCs may be used (i.e., uplink grants that only trigger CCs marked with CIF). Uplink grants without UL-SCH data transmission may be transmitted in the same TTI as uplink grants with UL-SCH data transmission or transmitted in a subsequent TTI.

The application of these complementary solutions varies depending on different application environments. In most cases, only one uplink grant needs to be sent, so uplink grant overhead is relatively small. Furthermore, the CSI request field with a limited number of bits makes the DCI format relatively small. Thus, Alt3 achieves a trade-off between DCI format size and UL grant overhead, which is a preferred implementation solution.

Alt4: The aperiodic CSI request field in the uplink grant has a limited number of bits, wherein the number of bits is greater than 1 and less than the allowed number of CCs in the system. Bit mapping with limited bits in all UL grants is used to trigger aperiodic CSI reporting for a configurable number of DL CCs, and each bit is used to trigger aperiodic CSI reporting for a subset of up to DL CCs. For example, in the case that the system allows 5 CCs at most (e.g., CC1, CC2, CC3, CC4, and CC5), CC1 and CC2 are grouped into a subset, CC3 and CC4 are grouped into another subset, and CC5 is a subset. Those skilled in the art would appreciate that the CC grouping may have various ways. For example, each of CC1 and CC2 is a subset, while CC3-CC5 are grouped into a subset, etc. The CC grouping may be pre-assigned and semi-statically configured by higher layer signalling. Each bit in the limited bit-mapping of UL grant can trigger aperiodic CSI reporting for a subset of DL CCs. Thus the DCI format size is saved. Although additional CSI reporting overhead is incurred when not all CCs in the subset of CCs are triggered for aperiodic CSI reporting, this solution is still superior to using one uplink grant to trigger aperiodic CSI reporting for all DL CCs.

Alt5: The aperiodic CSI request field in the uplink grant has a limited number of bits, wherein the number of bits is greater than 1 and less than the allowed number of CCs in the system. The limited bits in the CSI request field may have different combination values, i.e., this CSI request field may have different values. It is possible to indicate CSI requests for different combinations of DL CCs by these different values. Mapping relationships between different values of the CSI request field and CSI requests for different combinations (subsets) of DL CCs may be pre-assigned by higher layer signalling (e.g., RRC signalling). As described above, component carriers here may only consider activated CCs of UE or configured CCs of UE.

In one embodiment, the aperiodic CSI request field in an uplink grant has 2 bits, and UE has 3 activated (or configured) DL CCs, marked as CC1, CC2, and CC3, respectively. The CSI request field may have 4 different values, i.e., 00, 01, 10, and 11. It is possible to preassign mapping relationships between different values of the CSI request field and different CC combinations by higher layer signalling. For example, one CSI request value (e.g., 10) indicates triggering CSI reporting for only the DL CC that carries this uplink grant. A different value (e.g., 11) indicates triggering CSI reporting for all DL CCs. The other two values may indicate CSI reporting for the other two different combinations of DL CCs, for example, 00 indicates triggering no CSI reporting for any DL CC, and 01 indicates triggering CSI reporting for CC1 and CC2.

In another embodiment, the aperiodic CSI request field in uplink grant has 3 bits. The CSI request field may have 9 different values, i.e., 000, 001, . . . , 111. Hence, it is possible to express CSI requests for a maximum of 9 different combinations of DL CCs. Below is presented an example of mapping relationships between values of the CSI request field and activated DL CCs in the case that UE has 4 CCs.

000—trigger no CSI reporting for any DL CC;
100—trigger reporting for the DL CC (e.g., CC1) that carries the uplink grant;
001—trigger CSI reporting for CC1 & CC2;
010—trigger CSI reporting for CC2 & CC3;
. . .
111—trigger CSI reporting for all DL CCs.

Aperiodic SRS Request

In another embodiment of the present invention, there is provided an efficient mechanism to trigger aperiodic SRS transmission for multiple configurable UL CCs (e.g., an N number of UL CCs, wherein N is a positive integer equal to or greater than 1) by limited bit-mapping bits, where N is equal to or less than the number $N_{cc}$ of configured or activated CCs for UE, so as to achieve a tradeoff between DCI format size and UL grant overhead. In systems where some embodiments are applied, only requesting or triggering of CSI reporting for activated DL CCs might be allowed; hence, only activated CCs of UE are considered in such embodiments. In systems where other embodiments are applied, only triggering of CSI reporting for deactivated DL CCs might be allowed; hence, configured CCs of UE should be considered in those embodiments.

Triggering aperiodic SRS transmission for multiple CCs may employ the similar methods investigated for triggering aperiodic CSI reporting. That is, the above Alt1, Alt2, Alt3, Alt4, and Alt5 for CSI request may be used to SRS request through simple modifications. The only difference is that since CSI is channel quality feedback for DL CCs and SRS is reference signal transmission for UL CCs, bits in the CSI request field in uplink grant are mapped to the DL CC, while bits in the SRS request field in uplink grant are mapped to the UL CC.

Detailed description is presented below with reference to the figures.

FIG. 1 illustrates a schematic view of DL/UL pair and cross-carrier scheduling in an LTE-Advanced system.

In the system, there are configured 3 DL CCs, namely CC1, CC2, and CC3, together with 2 UL CCs, namely CC1' and CC2'. CC1 and CC1' form a cell, and on CC1' there is data transmission to be scheduled; CC2 and CC2' form a cell. CC3 has no UL CC with which it is paired. In this case, cross scheduling is enabled.

Since on CC1' there is data transmission to be scheduled, eNB will send an uplink scheduling for data transmission on CC1'. According to the embodiments of the present invention, eNB may simultaneously trigger CSI reporting for CC1, CC2 and/or CC3 by mapping the CSI request field in the uplink scheduling. Further, eNB may simultaneously trigger SRS transmission for CC1' and CC2' by mapping the SRS request field in the uplink scheduling.

Illustration is presented below to processing of the CSI request field in the embodiments of the present invention by taking Alt3 for example. In one embodiment, it may be pre-specified that the CSI request field is 3-bit. One bit of the 3-bit CSI (e.g., the first bit) request field is assigned to the CC that is indicated in the CIF field, and the other two bits are mapped according to a priority order of DL CCs. If the high-to-low priority order of DL CCs is CC1, CC3, and CC2, in the case as illustrated in FIG. 1, the first bit of the CSI request field is mapped to CC1, the second bit to CC3, and the third bit to CC2. In one embodiment, the last bit (e.g., the third bit) of the 3-bit CSI request field may be assigned to the CC that is indicated in the CIF field, and the other two bits are assigned to the other two CCs in the CC sequential order given by upper layer signalling. In the case as illustrated in FIG. 1, the first bit of the CSI request field is mapped to CC2, the second bit to CC3, and the third bit to CC1.

Illustration is then presented below to processing of the SRS request field in the embodiments of the present invention by taking Alt3 for example. In one embodiment, it may be pre-specified that the SRS request field is 3-bit. Due to the moment of time in FIG. 1, only 2 UL CCs are configured for the UE, so one bit may be reserved. It may be specified by higher layer signalling that pne bit of the 3-bit SRS request field (e.g., the first bit) is to be assigned to the CC that is indicated in the CIF field, the middle bit is assigned to the other UL CC, and the last bit is used as a reserved bit.

Those skilled in the art would appreciate that if more UL CCs are configured or activated for the UE, it is then possible to correspond one bit of the SRS request field in uplink grant to the DL CC that is carrying the uplink grant, and to correspond the remaining bits to different UL CCs according to a priority order of UL CCs or CC serial numbers given by upper layer signalling.

Figure 2:
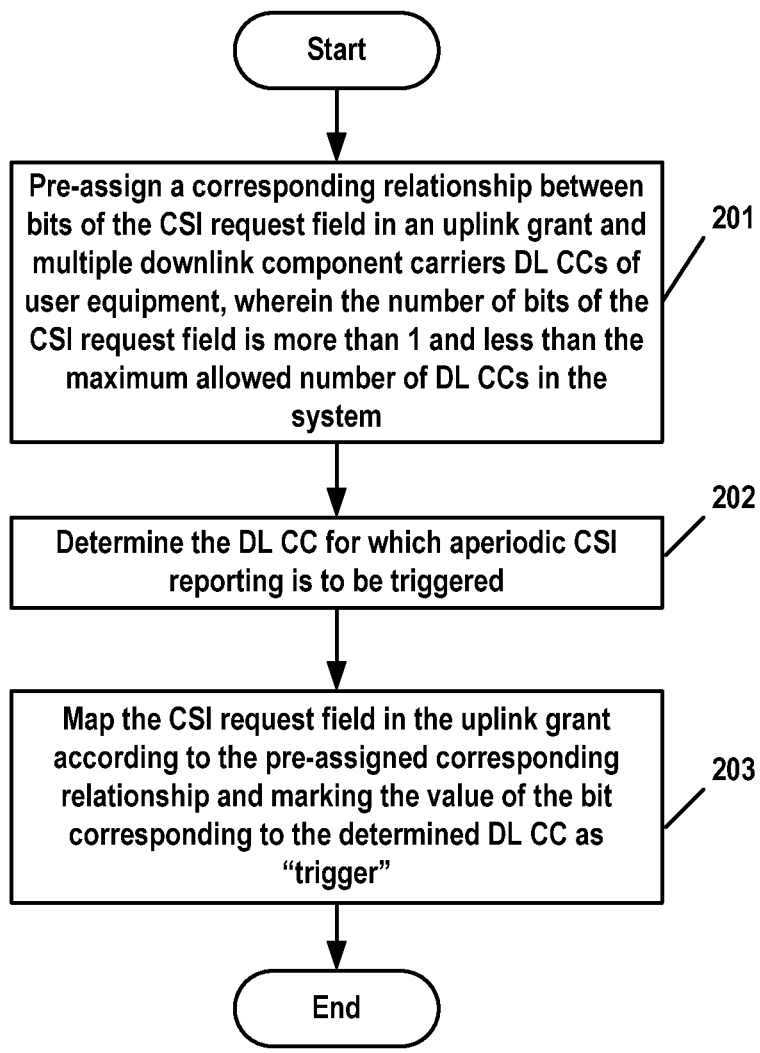
FIG. 2 illustrates a flowchart of a triggering method of aperiodic channel state information CSI for a carrier aggregation system according to an embodiment of the present invention.

FIG. 2 illustrates a flowchart of a triggering method of aperiodic channel state information CSI for a carrier aggregation system according to an embodiment of the present invention. As illustrated in FIG. 2, a corresponding relationship between bits of the CSI request field in uplink grant and multiple downlink component carriers DL CCs is pre-assigned in step 201, wherein the number of bits of the CSI request field is greater than 1 and less than the maximum allowed number of DL CCs in the system. In step 202, the DL CC for which aperiodic CSI reporting is to be triggered is determined. In step 203, the CSI request field in uplink grant is mapped according to the pre-assigned corresponding relationship, marking the value of the bit corresponding to the determined DL CC as "trigger."

According to one embodiment of the present invention, step 201 further comprises dividing all DL CCs for the user equipment UE into multiple subsets and corresponding different bits of the CSI request field to different subsets.

According to one embodiment of the present invention, step 203 further comprises marking the value of the bit corresponding to the subset to which the DL CC determined in step 202 belongs as "trigger."

According to one embodiment of the present invention, the number of bits of the CSI request field is equal to the number of subsets into which DL CCs are divided, and each bit corresponds to a different subset.

According to one embodiment of the present invention, step 201 further comprises corresponding one bit of the CSI request field in uplink grant to the DL CC that is carrying the uplink grant, and corresponding the remaining bits to different DL CCs according to a priority order of DL CCs or CC serial numbers given by upper layer signaling.

According to one embodiment of the present invention, step 203 further comprises marking the value of the bit corresponding to the DL CC determined in step 202 as "trigger" during mapping of the CSI request field.

According to one embodiment of the present invention, DL CCs corresponding to the remaining bits do not include a DL CC that has an associated uplink component carrier UL CC on which there is data transmission on the uplink shared channel UL SCH.

Figure 3:
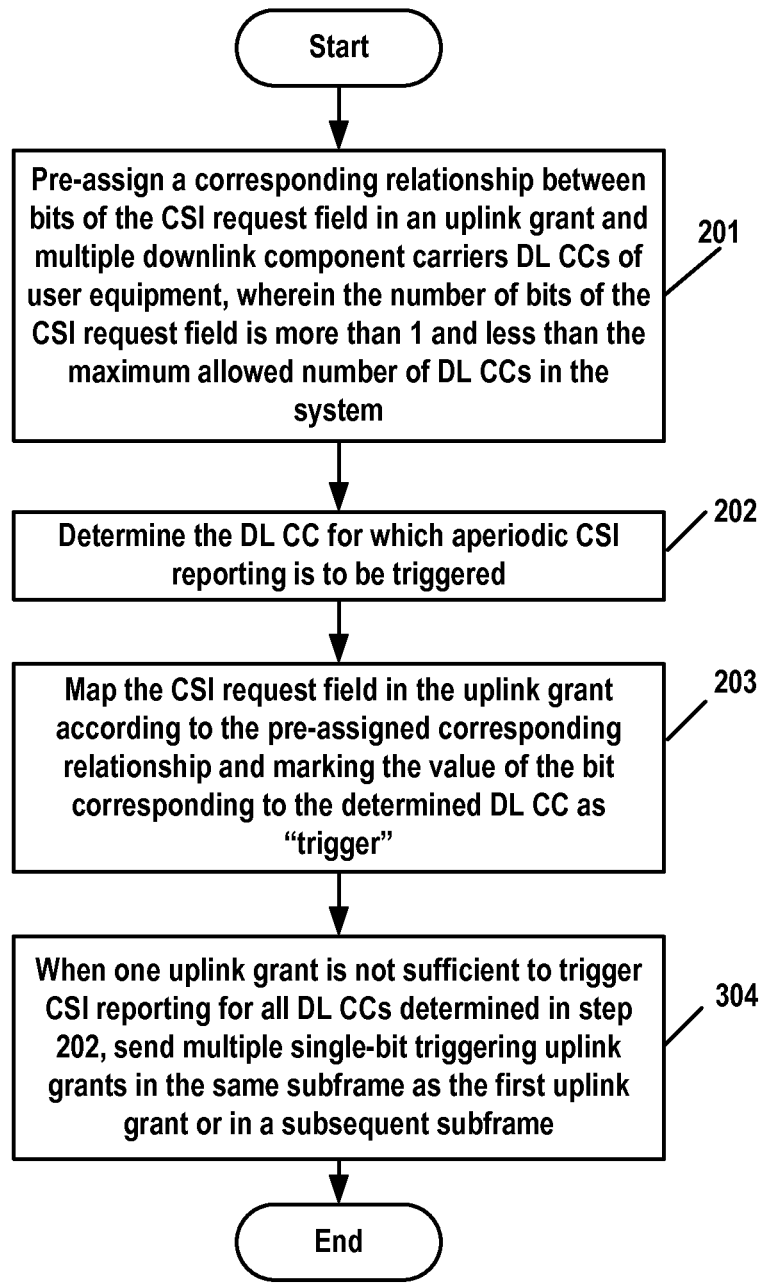
FIG. 3 illustrates a flowchart of a triggering method of aperiodic channel state information CSI for a carrier aggregation system according to another embodiment of the present invention.

FIG. 3 illustrates a flowchart of a triggering method of aperiodic channel state information CSI for a carrier aggregation system according to another embodiment of the present invention. The embodiment as illustrated in FIG. 3 not only includes steps 202-203 but also includes step 304. In step 304, when one uplink grant is not sufficient to trigger CSI reporting for all DL CCs determined in step 202, multiple single-bit triggering uplink grants are sent in the same subframe as the first uplink grant or in a subsequent subframe.

Figure 4:
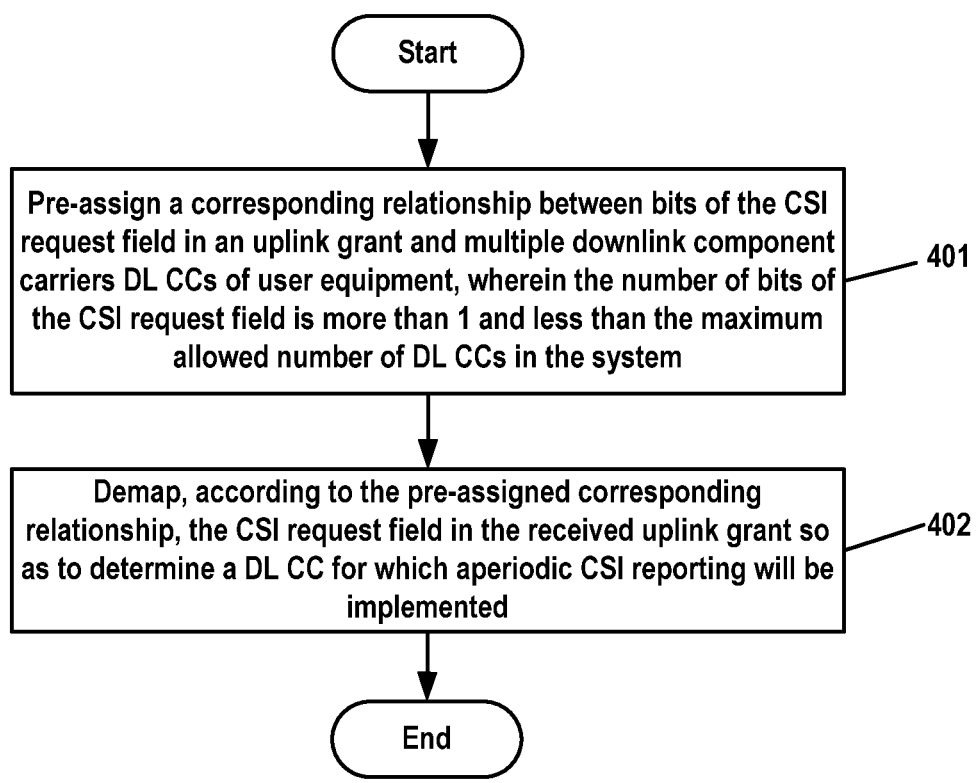
FIG. 4 illustrates a flowchart of a reporting method of aperiodic channel state information CSI for a carrier aggregation system according to an embodiment of the present invention.

FIG. 4 illustrates a flowchart of a reporting method of aperiodic channel state information CSI for a carrier aggregation system according to an embodiment of the present invention. As illustrated in FIG. 4, in step 401, a corresponding relationship between bits of the CSI request field in uplink grant and multiple downlink component carriers DL CCs of the user equipment is pre-assigned, wherein the number of bits of the CSI request field is greater than 1 and less than the maximum allowed number of DL CCs in the system. In step 402, the CSI request field in the received uplink grant is de-mapped according to the pre-assigned corresponding relationship, so as to determine a DL CC for which aperiodic CSI reporting will be implemented.

According to one embodiment of the present invention, step 401 further comprises dividing all DL CCs for the user equipment UE into multiple subsets and corresponding different bits of the CSI request field to different subsets.

According to one embodiment of the present invention, step 402 further comprises determining that aperiodic CSI reporting is to be implemented for all DL CCs in the subset corresponding to the bit that is marked as "trigger" in the CSI request field.

According to one embodiment of the present invention, the number of bits of the CSI request field is equal to the number of subsets into which DL CCs are divided, and each bit corresponds to a different subset.

According to one embodiment of the present invention, step 401 further comprises corresponding one bit of the CSI request field in uplink grant to the DL CC that is carrying the uplink grant, and corresponding the remaining bits to different DL CCs according to a priority order of DL CCs or CC serial numbers given by upper layer signaling.

According to one embodiment of the present invention, step 402 further comprises determining that aperiodic CSI reporting is to be implemented for the DL CC corresponding to the bit that is marked as "trigger" in the CSI request field.

According to one embodiment of the present invention, DL CCs corresponding to the remaining bits do not include a DL CC that has an associated uplink component carrier UL CC on which there is data transmission on the uplink shared channel UL SCH.

Figure 5:
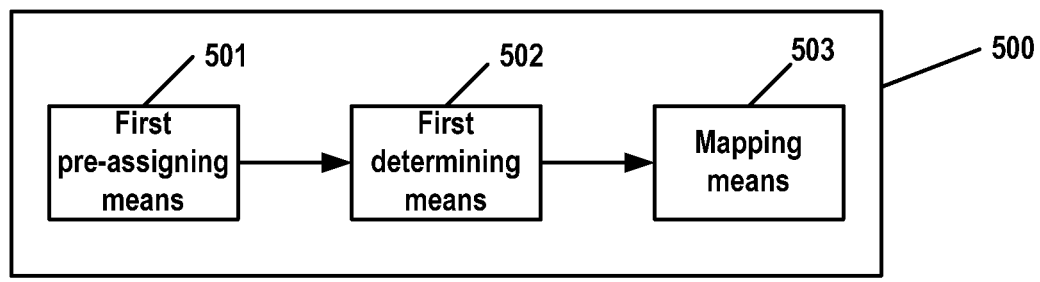
FIG. 5 illustrates a block diagram of a triggering apparatus of aperiodic channel state information CSI for a carrier aggregation system according to an embodiment of the present invention.

FIG. 5 illustrates a block diagram of a triggering apparatus of aperiodic channel state information CSI for a carrier aggregation system according to an embodiment of the present invention. The triggering apparatus as illustrated in FIG. 5 comprises first pre-assigning means 501, first determining means 502, and mapping means 503. The first pre-assigning means is for pre-assigning a corresponding relationship between bits of the CSI request field in uplink grant and multiple downlink component carriers DL CCs of user equipment, wherein the number of bits of the CSI request field is greater than 1 and less than the maximum allowed number of DL CCs in the system. The first determining means 502 is for determining the DL CC for which aperiodic CSI reporting is to be triggered. The mapping means 503 is for mapping the CSI request field in uplink grant according to the pre-assigned corresponding relationship, marking the value of the bit corresponding to the determined DL CC as "trigger."

According to one embodiment of the present invention, the first pre-assigning means 501 is further for dividing all DL CCs for the user equipment UE into multiple subsets and corresponding different bits of the CSI request field to different subsets.

According to one embodiment of the present invention, the mapping means 503 is further for marking the value of the bit corresponding to the subset to which the DL CC determined in step 202 belongs as "trigger."

According to one embodiment of the present invention, the number of bits of the CSI request field is equal to the number of subsets into which DL CCs are divided, and each bit corresponds to a different subset.

According to one embodiment of the present invention, the first pre-assigning means 501 is further for corresponding one bit of the CSI request field in uplink grant to the DL CC that is carrying the uplink grant, and corresponding the remaining bits to different DL CCs according to a priority order of DL CCs or CC serial numbers given by upper layer signaling.

According to one embodiment of the present invention, the mapping means 503 is further for marking the value of the bit corresponding to the DL CC determined by the first determining means 502 as "trigger" during mapping of the CSI request field.

According to one embodiment of the present invention, DL CCs corresponding to the remaining bits do not include a DL CC that has an associated uplink component carrier UL CC on which there is data transmission on the uplink shared channel UL SCH.

Figure 6:
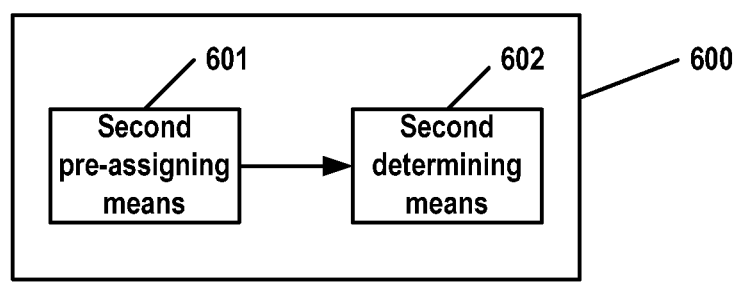
FIG. 6 illustrates a block diagram of a reporting apparatus of aperiodic channel state information CSI for a carrier aggregation system according to an embodiment of the present invention.

FIG. 6 illustrates a block diagram of a reporting apparatus of aperiodic channel state information CSI for a carrier aggregation system according to an embodiment of the present invention. The reporting apparatus 600 as illustrated in FIG. 6 comprises second pre-assigning means 601 and second determining means 602. The second pre-assigning means 601 is for pre-assigning a corresponding relationship between bits of the CSI request field in uplink grant and multiple downlink component carriers DL CCs of the user equipment, wherein the number of bits of the CSI request field is greater than 1 and less than the maximum allowed number of DL CCs in the system. The second determining means 602 is for de-mapping, according to the pre-assigned corresponding relationship, the CSI request field in the received uplink grant so as to determine a DL CC for which aperiodic CSI reporting will be implemented.

According to one embodiment of the present invention, the second pre-assigning means 601 is further for dividing all DL CCs for the user equipment UE into multiple subsets and corresponding different bits of the CSI request field to different subsets.

According to one embodiment of the present invention, the second determining means 602 is further for determining that aperiodic CSI reporting is to be implemented for all DL CCs in the subset corresponding to the bit that is marked as "trigger" in the CSI request field.

According to one embodiment of the present invention, the number of bits of the CSI request field is equal to the number of subsets into which DL CCs are divided, and each bit corresponds to a different subset.

According to one embodiment of the present invention, the second pre-assigning means is further for corresponding one bit of the CSI request field in uplink grant to the DL CC that is carrying the uplink grant, and corresponding the remaining bits to different DL CCs according to a priority order of DL CCs or CC serial numbers given by upper layer signaling.

According to one embodiment of the present invention, the second determining means 602 is further for determining that aperiodic CSI reporting is to be implemented for the DL CC corresponding to the bit that is marked as "trigger" in the CSI request field.

According to one embodiment of the present invention, DL CCs corresponding to the remaining bits do not include a DL CC that has an associated uplink component carrier UL CC on which there is data transmission on the uplink shared channel UL SCH.

Figure 7:
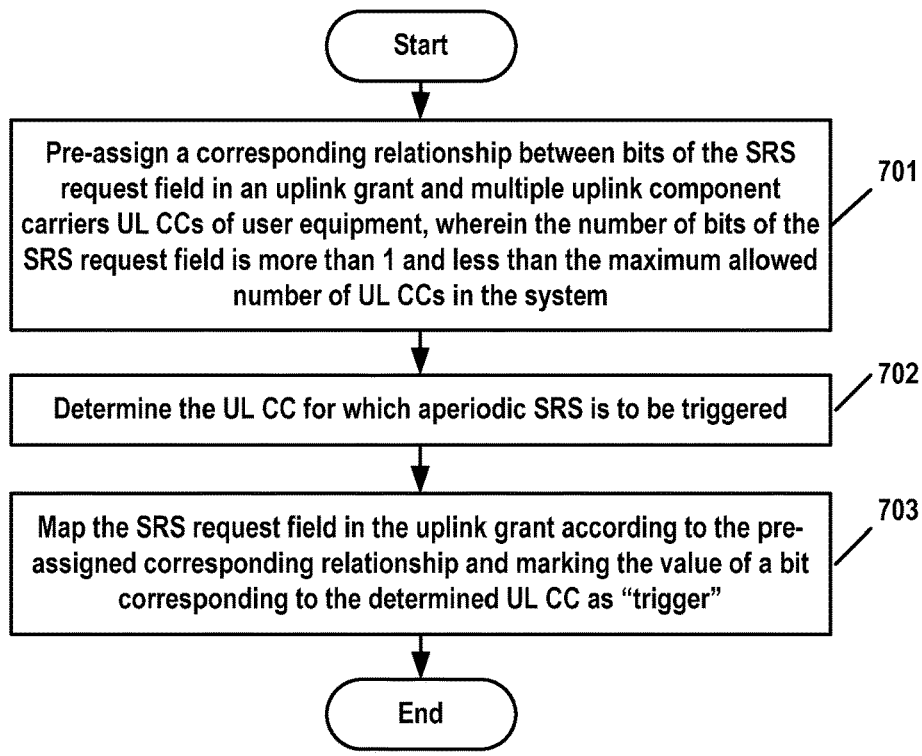
FIG. 7 illustrates a flowchart of a triggering method of an aperiodic uplink sounding reference signal SRS for a carrier aggregation system according to an embodiment of the present invention.

FIG. 7 illustrates a flowchart of a triggering method of an aperiodic uplink sounding reference signal SRS for a carrier aggregation system according to an embodiment of the present invention. As illustrated in FIG. 7, a corresponding relationship between bits of the SRS request field in uplink grant and multiple uplink component carriers UL CCs is pre-assigned in step 701, wherein the number of bits of the SRS request field is greater than 1 and less than the maximum allowed number of UL CCs in the system. In step 702, the UL CC for which aperiodic SRS is to be triggered is determined. In step 703, the SRS request field in uplink grant is mapped according to the pre-assigned corresponding relationship, marking the value of the bit corresponding to the determined UL CC as "trigger."

According to one embodiment of the present invention, step 701 further comprises dividing all UL CCs for the user equipment UE into multiple subsets and corresponding different bits of the SRS request field to different subsets.

According to one embodiment of the present invention, step 703 further comprises marking the value of the bit corresponding to the subset to which the UL CC determined in step 702 belongs as "trigger."

According to one embodiment of the present invention, step 701 further comprises corresponding one bit of the SRS request field in uplink grant to the CC that is specified by the CIF field in the same uplink grant, and corresponding the remaining bits to different UL CCs according to a priority order of UL CCs or CC serial numbers given by upper layer signaling. Those skilled in the art would appreciate that the CC specified by the CIF field in the same uplink grant is the carrier paired with the DL CC that is carrying the uplink grant.

According to one embodiment of the present invention, step 703 further comprises marking the value of the bit corresponding to the UL CC determined in step 702 as "trigger" during mapping of the SRS request field.

Figure 8:
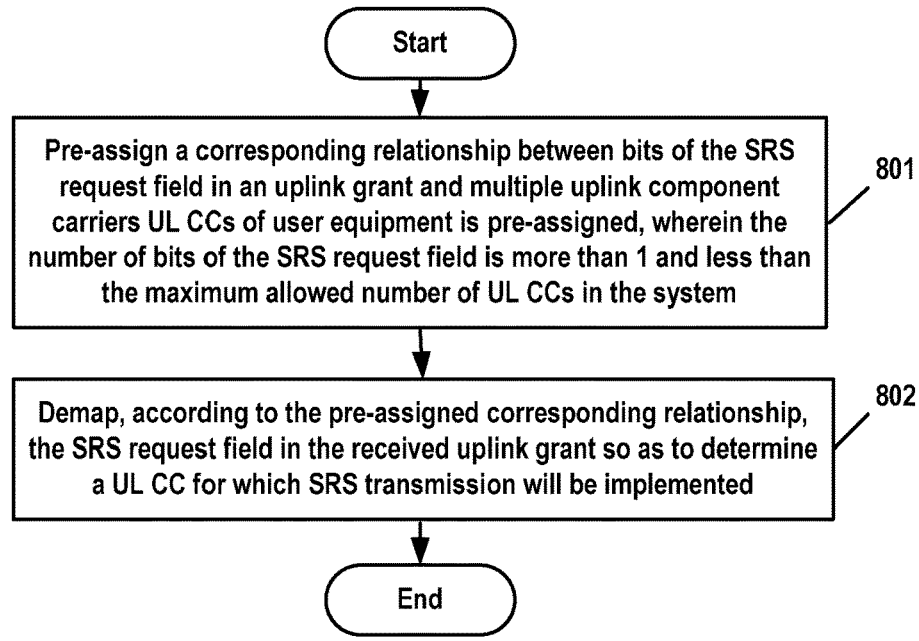
FIG. 8 illustrates a flowchart of a transmission method of aperiodic uplink sounding reference signal SRS for a carrier aggregation system according to an embodiment of the present invention.

FIG. 8 illustrates a flowchart of a transmission method of aperiodic uplink sounding reference signal SRS for a carrier aggregation system according to an embodiment of the present invention. As illustrated in FIG. 8, in step 801, a corresponding relationship between bits of the SRS request field in uplink grant and multiple uplink component carriers UL CCs of the user equipment is pre-assigned, wherein the number of bits of the SRS request field is greater than 1 and less than the maximum allowed number of UL CCs in the system. In step 802, the SRS request field in the received uplink grant is de-mapped according to the pre-assigned corresponding relationship, so as to determine the UL CC for which SRS transmission will be implemented.

According to one embodiment of the present invention, step 801 further comprises dividing all UL CCs for the user equipment UE into multiple subsets and corresponding different bits of the SRS request field to different subsets.

According to one embodiment of the present invention, step 802 further comprises determining that SRS transmission is to be implemented on all UL CCs in the subset corresponding to the bit that is marked as "trigger" in the SRS request field.

According to one embodiment of the present invention, step 801 further comprises corresponding one bit of the SRS request field in uplink grant to the CC that is specified by the CIF field in the same uplink grant, and corresponding the remaining bits to different UL CCs according to a priority order of UL CCs or CC serial numbers given by upper layer signaling.

According to one embodiment of the present invention, step 802 further comprises determining that SRS transmission is to be implemented on the UL CC corresponding to the bit that is marked as "trigger" in the SRS request field.

Figure 9:
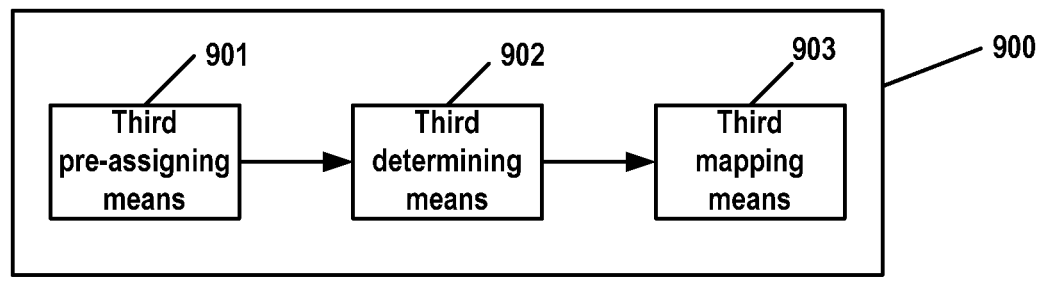
FIG. 9 illustrates a block diagram of a triggering apparatus of an aperiodic uplink sounding reference signal SRS for a carrier aggregation system according to an embodiment of the present invention.

FIG. 9 illustrates a block diagram of a triggering apparatus of an aperiodic uplink sounding reference signal SRS for a carrier aggregation system according to an embodiment of the present invention. The triggering apparatus as illustrated in FIG. 9 comprises third pre-assigning means 901, third determining means 902, and third mapping means 903. The third pre-assigning means 901 is for pre-assigning a corresponding relationship between bits of the SRS request field in uplink grant and multiple uplink component carriers UL CCs of user equipment wherein the number of bits of the SRS request field is greater than 1 and less than the maximum allowed number of UL CCs in the system. The third determining means 902 is for determining the UL CC for which aperiodic SRS is to be triggered. The third mapping means 903 is for mapping the SRS request field in uplink grant according to the pre-assigned corresponding relationship, marking the value of the bit corresponding to the determined UL CC as "trigger."

According to one embodiment of the present invention, the third pre-assigning means 901 further divides all UL CCs for the user equipment UE into multiple subsets and corresponds different bits of the SRS request field to different subsets.

According to one embodiment of the present invention, the third mapping means 903 further marks the value of the bit corresponding to the subset to which the UL CC determined by the third determining means 902 belongs as "trigger."

According to one embodiment of the present invention, the third pre-assigning means 901 further corresponds one bit of the SRS request field in uplink grant to the CC that is specified by the CIF field in the same uplink grant, and corresponds the remaining bits to different UL CCs according to a priority order of UL CCs or CC serial numbers given by upper layer signaling.

According to one embodiment of the present invention, the third mapping means 903 further marks the value of the bit corresponding to the UL CC determined by the third determining means 902 as "trigger" during mapping of the SRS request field.

Figure 10:
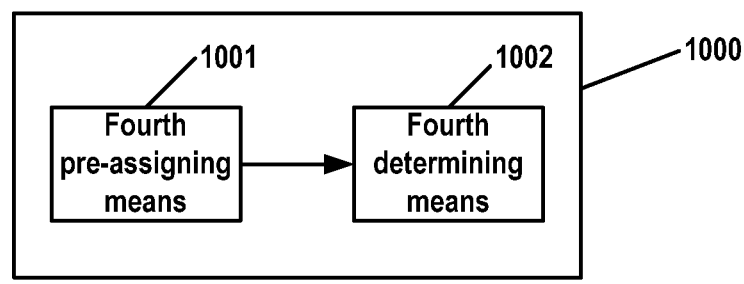
FIG. 10 illustrates a block diagram of a transmission apparatus of aperiodic uplink sounding reference signal SRS for a carrier aggregation system according to an embodiment of the present invention.

FIG. 10 illustrates a block diagram of a transmission apparatus of aperiodic uplink sounding reference signal SRS for a carrier aggregation system according to an embodiment of the present invention. The transmission apparatus as illustrated in FIG. 10 comprises fourth pre-assigning means 1001 and fourth determining means 1002. The fourth pre-assigning means 1001 is for pre-assigning a corresponding relationship between bits of the SRS request field in uplink grant and multiple uplink component carriers UL CCs of the user equipment, wherein the number of bits of the SRS request field is greater than 1 and less than the maximum allowed number of UL CCs in the system. The fourth determining means 1002 is for de-mapping, according to the pre-assigned corresponding relationship, the SRS request field in the received uplink grant so as to determine the UL CC for which SRS transmission will be implemented.

According to one embodiment of the present invention, the fourth pre-assigning means further divides all UL CCs for the user equipment UE into multiple subsets and corresponds different bits of the SRS request field to different subsets.

According to one embodiment of the present invention, the fourth determining means 1002 further determines that SRS transmission is to be implemented on all UL CCs in the subset corresponding to the bit that is marked as "trigger" in the SRS request field.

According to one embodiment of the present invention, the fourth pre-assigning means 1001 further corresponds one bit of the SRS request field in uplink grant to the CC that is specified by the CIF field in the same uplink grant, and corresponds the remaining bits to different UL CCs according to a priority order of UL CCs or CC serial numbers given by upper layer signaling.

According to one embodiment of the present invention, the fourth determining means 1002 further determines that SRS transmission is to be implemented on the UL CC corresponding to the bit that is marked as "trigger" in the SRS request field.

Figure 11:
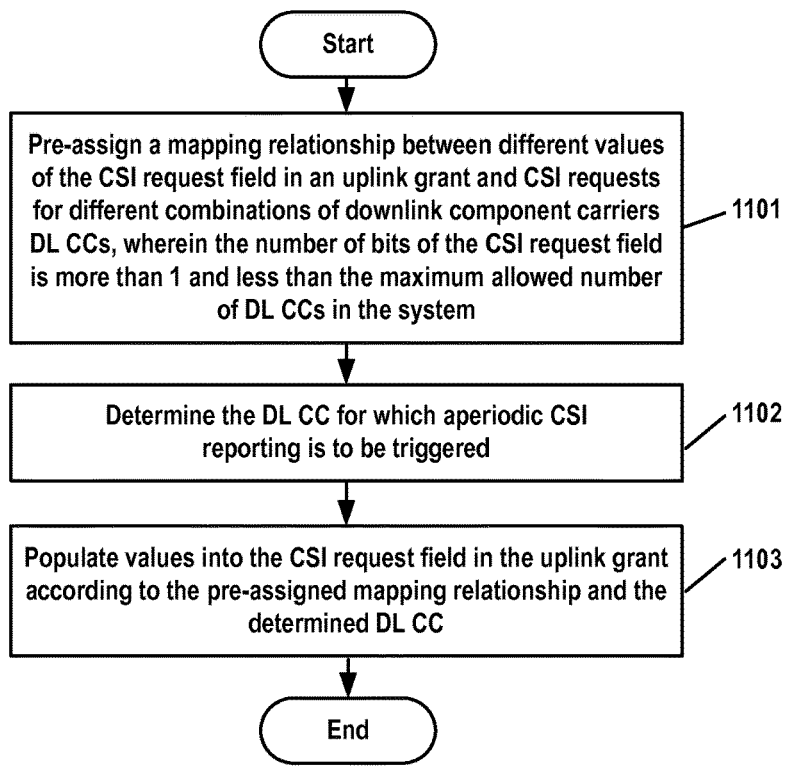
FIG. 11 illustrates a flowchart of a triggering method of aperiodic channel state information CSI for a carrier aggregation system according to another embodiment of the present invention.

FIG. 11 illustrates a flowchart of a triggering method of aperiodic channel state information CSI for a carrier aggregation system according to another embodiment of the present invention. As illustrated in FIG. 11, a mapping relationship between different values of the CSI request field in uplink grant and CSI requests for different combinations of downlink component carriers DL CCs is pre-assigned in step 1101, wherein the number of bits of the CSI request field is greater than 1 and less than the maximum allowed number of DL CCs in the system. In step 1102, the DL CC for which aperiodic CSI reporting is to be triggered is determined. In step 1103, values of the CSI request field in an uplink grant is populated according to the pre-assigned mapping relationship and the determined DL CC.

According to one embodiment of the present invention, the mapping relationship comprises: mapping a first value of the CSI request field to indicate that CSI reporting for the DL CC carrying the uplink grant is to be triggered, mapping a second value of the CSI request field to indicate that CSI reporting for all DL CCs is to be triggered, and mapping other values to indicate that CSI reporting for other different combinations of DL CCs is to be triggered.

Figure 12:
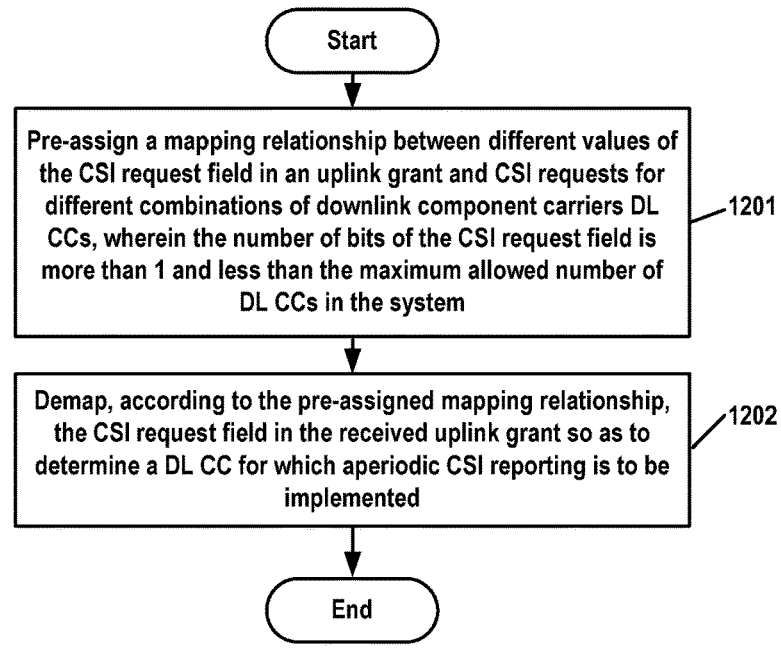
FIG. 12 illustrates a flowchart of a reporting method of aperiodic channel state information CSI for a carrier aggregation system according to another embodiment of the present invention.

FIG. 12 illustrates a flowchart of a reporting method of aperiodic channel state information CSI for a carrier aggregation system according to another embodiment of the present invention. As illustrated in FIG. 12, a mapping relationship between different values of the CSI request field in uplink grant and CSI requests for different combinations of downlink component carriers DL CCs is pre-assigned in step 1201, wherein the number of bits of the CSI request field is greater than 1 and less than the maximum allowed number of DL CCs in the system. In step 1202, the CSI request field in the received uplink grant is de-mapped according to the pre-assigned mapping relationship, so as to determine the DL CC for which aperiodic CSI reporting is to be implemented.

Figure 13:
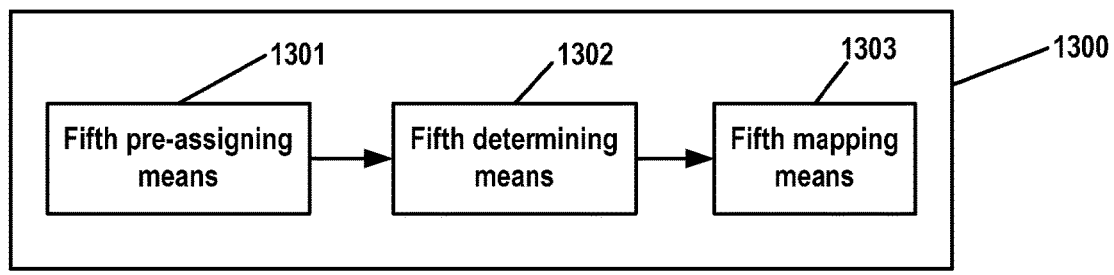
FIG. 13 illustrates a block diagram of a triggering apparatus of aperiodic channel state information CSI for a carrier aggregation system according to another embodiment of the present invention.

FIG. 13 illustrates a block diagram of a triggering apparatus of aperiodic channel state information CSI for a carrier aggregation system according to another embodiment of the present invention. The triggering apparatus 1300 as illustrated in FIG. 13 comprises fifth pre-assigning means 1301, fifth determining means 1302, and fifth mapping means 1303. The fifth pre-assigning means 1301 is for pre-assigning a mapping relationship between different values of the CSI request field in uplink grant and CSI requests for different combinations of downlink component carriers DL CCs, wherein the number of bits of the CSI request field is greater than 1 and less than the maximum allowed number of DL CCs in the system. The fifth determining means 1302 is for determining the DL CC for which aperiodic CSI reporting is to be triggered. The fifth mapping means 1303 is for populating value of the CSI request field in uplink grant according to the pre-assigned mapping relationship and the determined DL CC.

Figure 14:
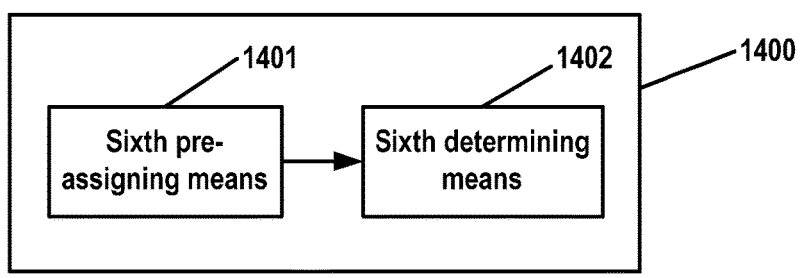
FIG. 14 illustrates a block diagram of a reporting apparatus of aperiodic channel state information CSI for a carrier aggregation system according to another embodiment of the present invention.

FIG. 14 illustrates a block diagram of a reporting apparatus of aperiodic channel state information CSI for a carrier aggregation system according to another embodiment of the present invention. The reporting apparatus 1400 as illustrated in FIG. 14 comprises sixth pre-assigning means 1401 and sixth determining means 1402. The sixth pre-assigning means 1401 is for pre-assigning a mapping relationship between different values of the CSI request field in uplink grant and CSI requests for different combinations of downlink component carriers DL CCs, wherein the number of bits of the CSI request field is greater than 1 and less than the maximum allowed number of DL CCs in the system. The sixth determining means 1402 is for de-mapping, according to the pre-assigned mapping relationship, the CSI request field in the received uplink grant so as to determine the DL CC for which aperiodic CSI reporting is to be implemented.

Figure 15:
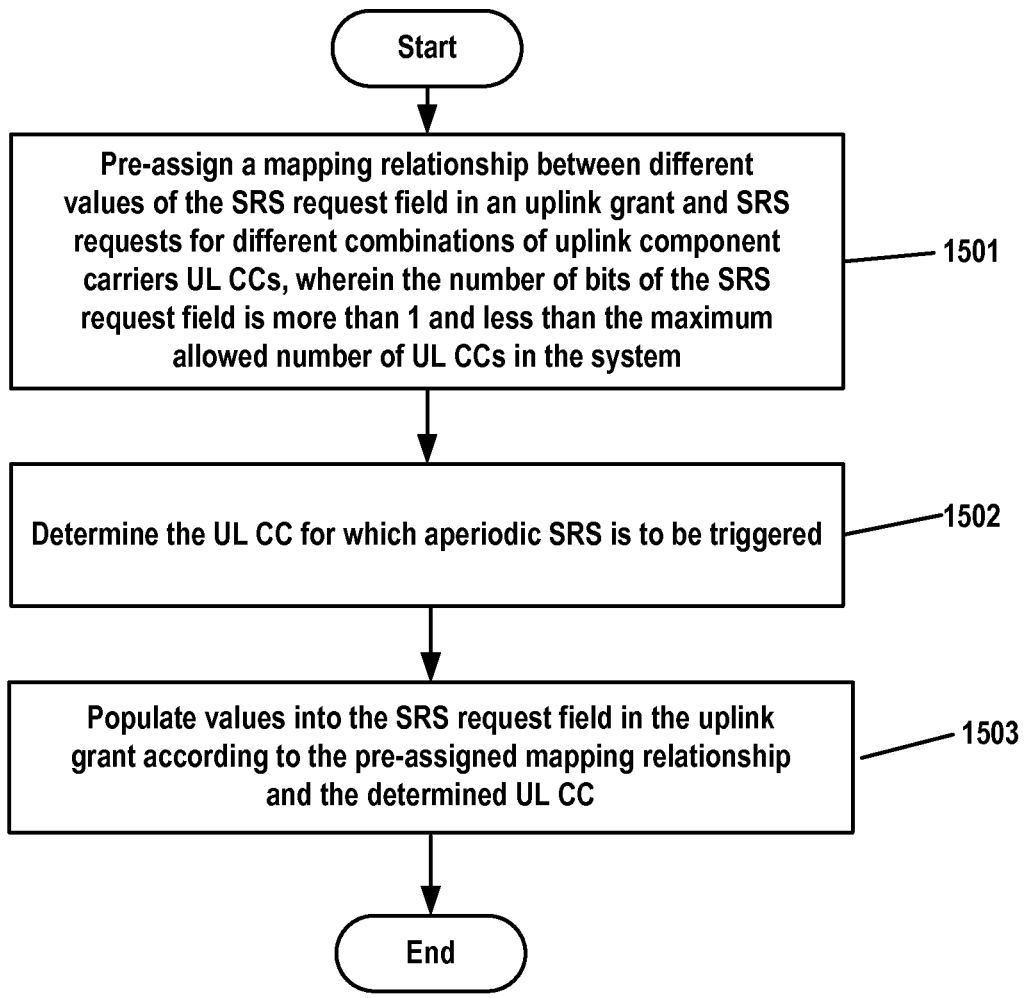
FIG. 15 illustrates a flowchart of a triggering method of an aperiodic uplink sounding reference signal SRS for a carrier aggregation system according to another embodiment of the present invention.

FIG. 15 illustrates a flowchart of a triggering method of an aperiodic uplink sounding reference signal SRS for a carrier aggregation system according to another embodiment of the present invention. As illustrated in FIG. 15, a mapping relationship between different bits of the SRS request field in uplink grant and SRS requests for different combinations of uplink component carriers UL CCs is pre-assigned in step 1501, wherein the number of bits of the SRS request field is greater than 1 and less than the maximum allowed number of UL CCs in the system. In step 1502, the UL CC for which aperiodic SRS is to be triggered is determined. In step 1503, values are populated into the SRS request field in uplink grant according to the pre-assigned mapping relationship and the determined UL CC.

According to one embodiment of the present invention, the mapping relationship comprises: mapping a first value of the SRS request field to indicate that SRS transmission on the CC specified by the carrier indicator field in uplink grant is to be triggered, and mapping a second value of the SRS request field to indicate that SRS transmission on all UL CCs is to be triggered.

Figure 16:
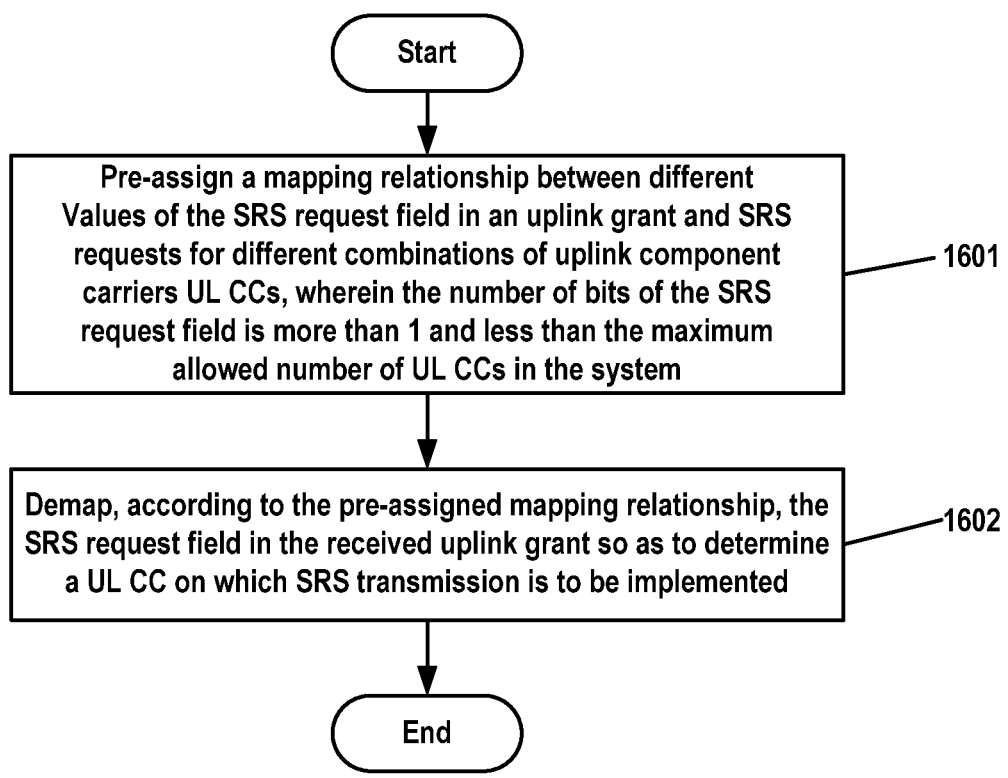
FIG. 16 illustrates a flowchart of a transmission method of an aperiodic uplink sounding reference signal SRS for a carrier aggregation system according to another embodiment of the present invention.

FIG. 16 illustrates a flowchart of a transmission method of an aperiodic uplink sounding reference signal SRS for a carrier aggregation system according to another embodiment of the present invention. As illustrated in FIG. 16, a mapping relationship between different bits of the SRS request field in uplink grant and SRS requests for different combinations of uplink component carriers UL CCs is pre-assigned in step 1601, wherein the number of bits of the SRS request field is greater than 1 and less than the maximum allowed number of UL CCs in the system. In step 1602, the SRS request field in the received uplink grant is de-mapped according to the pre-assigned mapping relationship, so as to determine a UL CC on which SRS transmission is to be implemented.

Figure 17:
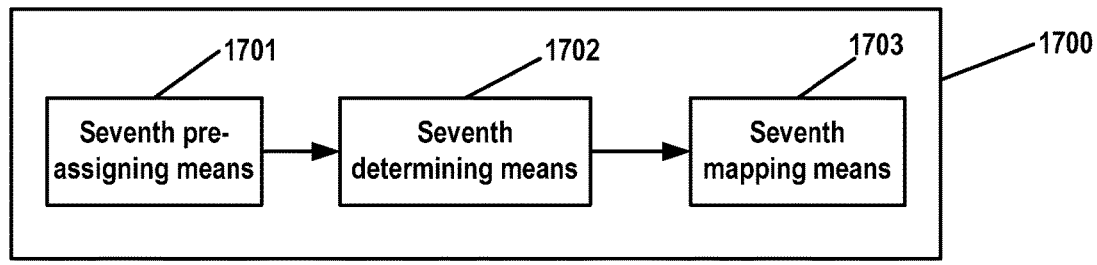
FIG. 17 illustrates a block diagram of a triggering apparatus of an aperiodic uplink sounding reference signal SRS for a carrier aggregation system according to another embodiment of the present invention.

FIG. 17 illustrates a block diagram of a triggering apparatus of an aperiodic uplink sounding reference signal SRS for a carrier aggregation system according to another embodiment of the present invention. The triggering apparatus 1700 as illustrated in FIG. 17 comprises seventh pre-assigning means 1701, seventh determining means 1702, and seventh mapping means 1703. The seventh pre-assigning means 1701 is for pre-assigning a mapping relationship between different bits of the SRS request field in uplink grant and SRS requests for different combinations of uplink component carriers UL CCs, wherein the number of bits of the SRS request field is greater than 1 and less than the maximum allowed number of UL CCs in the system. The seventh determining means 1702 is for determining the UL CC for which aperiodic SRS is to be triggered. The seventh mapping means 1703 is for populating values of the SRS request field in uplink grant according to the pre-assigned mapping relationship and the determined UL CC.

Figure 18:
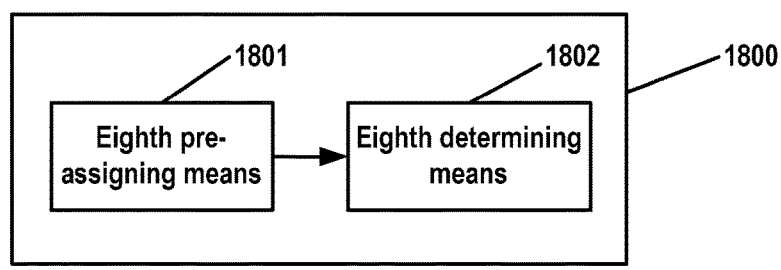
FIG. 18 illustrates a block diagram of a transmission apparatus of an aperiodic uplink sounding reference signal SRS for a carrier aggregation system according to another embodiment of the present invention.

FIG. 18 illustrates a block diagram of a transmission apparatus of an aperiodic uplink sounding reference signal SRS for a carrier aggregation system according to another embodiment of the present invention. The apparatus as illustrated in FIG. 18 comprises eighth pre-assigning means 1801 and eighth determining means 1802. The eighth pre-assigning means 1801 is for pre-assigning a mapping relationship between different bits of the SRS request field in uplink grant and SRS requests for different combinations of uplink component carriers UL CCs, wherein the number of bits of the SRS request field is greater than 1 and less than the maximum allowed number of UL CCs in the system. The eighth determining means 1802 is for de-mapping, according to the pre-assigned mapping relationship, the SRS request field in the received uplink grant so as to determine a UL CC on which SRS transmission is to be implemented.

The embodiments of the present invention provide a mechanism to trigger aperiodic CSI/SRS for a configurable number of DL CCs for carrier aggregation. The mechanism uses a limited number of bits as the CSI/SRS request field and indicates aperiodic CSI/SRS requests for different combinations of DL CCs through bit mapping or multi-bit value mapping. As such, the mechanism not only can be configured flexibly but also minimizes additional overhead for uplink grant, thereby achieving a tradeoff between DCL format size and UL grant overhead. Compared with the existing solutions, the present invention increases no feedback delay and achieves a tradeoff between DCI format size and UL grant overhead by triggering aperiodic CSI/SRS for multiple DL CCs in one subset.

Therefore, the solution of triggering aperiodic CSI reporting for configurable DL CCs achieves reduced CSI reporting delay and tolerable CSI reporting overhead.

The embodiments of the present invention have been described above. However, the present invention is not limited to the specific methods and apparatuses. On the contrary, those skilled in the art may make various variations or modifications within the scope of the appended claims.

What is claimed is:

1. A triggering method of aperiodic channel state information (CSI) for a carrier aggregation system, comprising:
    via a processor, pre-assigning a mapping relationship between different values of a CSI request field in an uplink grant and CSI requests for different combinations of downlink component carriers (DL CCs), wherein a number of bits of the CSI request field is limited, being greater than 1 and less than a number of activated or configured DL CCs in the carrier aggregation system, wherein the number of activated or configured DL CCs corresponds to a maximum allowed number of DL CCs in the carrier aggregation system, and wherein the limited bits in the CSI request field have different combination values;
    via the processor, determining the DL CC for which aperiodic CSI reporting is to be triggered; and
    via the processor, populating a value of the CSI request field in the uplink grant according to the pre-assigned mapping relationship and the determined DL CC,
    wherein mapping relationships between different combination values of the CSI request field and different DL CC combinations are preassigned by higher layer signaling,
    wherein each combination value indicates one combination of DL CCs.

2. The method according to claim 1, wherein the mapping relationship comprises: mapping a first value of the CSI request field to indicate that CSI reporting for the DL CC carrying the uplink grant is to be triggered.

3. The method according to claim 1, wherein the mapping relationship comprises: mapping a second value of the CSI request field to indicate that CSI reporting for DL CCs is to be triggered.

4. The method according to claim 1, wherein the mapping relationship comprises: mapping a third value of the CSI request field to indicate no CSI reporting for DL CCs is to be triggered.

5. The method according to claim 1, further comprising:
when one uplink grant is not sufficient to trigger CSI reporting for DL CCs determined, sending multiple single-bit triggering uplink grants in the same subframe as the first uplink grant or in a subsequent subframe.

6. The method according to claim 1, wherein an aperiodic CSI request field in an uplink grant has 2 bits.

7. A reporting method of aperiodic channel state information CSI for a carrier aggregation system, comprising:
via a processor, pre-assigning a mapping relationship between different values of a CSI request field in an uplink grant and CSI requests for different combinations of downlink component carriers (DL CCs), wherein a number of bits of the CSI request field is limited, being greater than 1 and less than a number of activated or configured DL CCs in the carrier aggregation system, wherein the number of activated or configured DL CCs corresponds to the maximum allowed number of DL CCs in the carrier aggregation system, and wherein the limited bits in the CSI request field have different combination values; and
via the processor, demapping, according to the pre-assigned mapping relationship, the CSI request field in the received uplink grant so as to determine the DL CC for which aperiodic CSI reporting is to be implemented,
wherein mapping relationships between different combination values of the CSI request field and different DL CC combinations are preassigned by higher layer signaling,
wherein each combination value indicates one combination of DL CCs.

8. The method according to claim 7, wherein the mapping relationship comprises: mapping a first value of the CSI request field to indicate that CSI reporting for the DL CC carrying the uplink grant is to be triggered, and mapping a second value of the CSI request field to indicate that CSI reporting for DL CCs is to be triggered.

9. The method according to claim 7, wherein the mapping relationship comprises: mapping a second value of the CSI request field to indicate that CSI reporting for DL CCs is to be triggered.

10. The method according to claim 7, wherein the mapping relationship comprises: mapping a third value of the CSI request field to indicate no CSI reporting for any DL CCs is to be triggered.

11. A triggering apparatus of aperiodic channel state information CSI for a carrier aggregation system, comprising:
one or more processors configured to:
pre-assign a mapping relationship between different values of a CSI request field in an uplink grant and CSI requests for different combinations of downlink component carriers DL CCs, wherein a number of bits of the CSI request field is limited, being greater than 1 and less than a number of activated or configured DL CCs in the carrier aggregation system, wherein the number of activated or configured DL CCs corresponds to a maximum allowed number of DL CCs in the carrier aggregation system, and wherein the limited bits in the CSI request field have different combination values;
determine the DL CC for which aperiodic CSI reporting is to be triggered; and
populate a value of the CSI request field in the uplink grant according to the pre-assigned mapping relationship and the determined DL CC,
wherein mapping relationships between different combination values of the CSI request field and different DL CC combinations are preassigned by higher layer signaling,
wherein each combination value indicates one combination of DL CCs.

12. The apparatus according to claim 11, wherein the mapping relationship comprises: mapping a first value of the CSI request field to indicate that CSI reporting for the DL CC carrying the uplink grant is to be triggered.

13. The apparatus according to claim 11, wherein the mapping relationship comprises: mapping a third value of the CSI request field to indicate no CSI reporting for DL CCs is to be triggered.

14. A reporting apparatus of aperiodic channel state information CSI for a carrier aggregation system, comprising:
one or more processors configured to:
pre-assign a mapping relationship between different values of a CSI request field in an uplink grant and CSI requests for different combinations of downlink component carriers DL CCs, wherein a number of bits of the CSI request field is limited, being greater than 1 and less than a number of activated or configured DL CCs in the carrier aggregation system, wherein the number of activated or configured DL CCs corresponds to a maximum allowed number of DL CCs in the carrier aggregation system, and wherein the limited bits in the CSI request field have different combination values; and
demap, according to the pre-assigned mapping relationship, the CSI request field in the received uplink grant so as to determine the DL CC for which aperiodic CSI reporting is to be implemented,
wherein mapping relationships between different combination values of the CSI request field and different DL CC combinations are preassigned by higher layer signaling,
wherein each combination value indicates one combination of DL CCs.

15. The apparatus according to claim 14, wherein the mapping relationship comprises: mapping a first value of the CSI request field to indicate that CSI reporting for the DL CC carrying the uplink grant is to be triggered.

16. The apparatus according to claim 14, wherein the mapping relationship comprises: mapping a third value of the CSI request field to indicate no CSI reporting for DL CCs is to be triggered.

* * * * *